(12) United States Patent
Hora et al.

(10) Patent No.: US 8,822,944 B2
(45) Date of Patent: Sep. 2, 2014

(54) SURFACE CONTAMINATION MONITOR

(75) Inventors: Akihito Hora, Koganei (JP); Takeshi Ishikura, Hino (JP); Satoshi Takano, Hachioji (JP); Daisuke Inui, Hachioji (JP)

(73) Assignee: Fuji Electric Co., Ltd (JP)

( * ) Notice: Subject to any disclaimer, the term of this patent is extended or adjusted under 35 U.S.C. 154(b) by 288 days.

(21) Appl. No.: 13/144,053

(22) PCT Filed: Jul. 9, 2010

(86) PCT No.: PCT/JP2010/061664
§ 371 (c)(1),
(2), (4) Date: Mar. 9, 2012

(87) PCT Pub. No.: WO2011/004883
PCT Pub. Date: Jan. 13, 2011

(65) Prior Publication Data
US 2012/0161265 A1    Jun. 28, 2012

(30) Foreign Application Priority Data
Jul. 10, 2009 (JP) .................. 2009-164092

(51) Int. Cl.
*G01J 1/42* (2006.01)
*G01T 1/167* (2006.01)

(52) U.S. Cl.
CPC ..................... *G01T 1/167* (2013.01)
USPC ........................................ 250/394

(58) Field of Classification Search
CPC ....................................... G01T 1/167
USPC ........................................ 250/394
See application file for complete search history.

(56) References Cited

U.S. PATENT DOCUMENTS

| 4,879,466 A | 11/1989 | Kitaguchi et al. |
| 5,041,728 A * | 8/1991 | Spacher et al. ............... 250/366 |

FOREIGN PATENT DOCUMENTS

| EP | 0642178 A2 | 3/1995 |
| JP | 63-193088 A | 8/1988 |
| JP | 07-122776 A | 5/1995 |
| JP | 11-004012 A | 1/1999 |
| JP | 2001-228250 A | 8/2001 |

(Continued)

OTHER PUBLICATIONS

International Search Report issued in PCT/JP2010/061664 dated Oct. 5, 2010.

(Continued)

*Primary Examiner* — Kiho Kim
(74) *Attorney, Agent, or Firm* — Rossi, Kimms & McDowell LLP (57) ABSTRACT

Provided is a surface contamination monitor that includes a hand and foot contamination monitor that can be relocated to an inspection site in a simple manner. A surface contamination monitor has a folding mechanism that allows folding a monitor main body, and comprises a base whose top face is provided with radiation detection elements for measurement of a foot portion, a support column provided at a center of a far side of the top face of the base, and an upper unit, which is fixed to a top end portion of the support column, and on which there are provided radiation detection elements for measurement of a hand portion. The folding mechanism allows the support column to bend towards the top face of the base by way of a first hinge and to bend towards an opposite side by way of a second hinge.

10 Claims, 6 Drawing Sheets

(56) References Cited

FOREIGN PATENT DOCUMENTS

| JP | 2001-274450 A | 10/2001 |
| JP | 2001-296365 A | 10/2001 |
| JP | 2001-326376 A | 11/2001 |
| JP | 2003-167059 A | 6/2003 |
| JP | 2006-339360 A | 12/2006 |
| JP | 2007-114145 A | 5/2007 |
| JP | 2008-268038 A | 11/2008 |
| JP | 2009-139346 A | 6/2009 |

OTHER PUBLICATIONS

International Preliminary Search Report issued in International Appl No. PCT/JP2010/061664 dated Feb. 7, 2012.

* cited by examiner

SURFACE CONTAMINATION MONITOR

TECHNICAL FIELD

The present invention relates to a surface contamination monitor that detects radiation emitted by a radioactive substance that is adhered to the surface of an inspection subject or of an inspection object, by way of a radiation detection element.

BACKGROUND ART

Hand and foot contamination monitors are known conventional surface contamination monitors that are installed in facilities where radioactive substances are handled, such as nuclear power plants and hospitals, for inspection of surface contamination by radioactive substances that are adhered to the hands, feet and clothing of personnel in such facilities. A hand and foot contamination monitor measures radiation (α rays, β rays and γ rays) emitted by a radioactive substance, sounds an alarm when a measurement value exceed an alarm level, and causes the contaminated areas to be displayed on a liquid crystal display.

As radiation detection sensors in such hand and foot contamination monitors there are used, for instance, GM counters, gas flow counters and scintillator-type radiation detectors. GM counters and gas flow counters detect radiation on the basis of the gas-ionizing action of radiation. In scintillator-type radiation detectors, light emitted by a scintillator on account of radiation is condensed by waveguides, and the condensed light is amplified by a photomultiplier tube, such that radiation is detected on the basis of amplified signals (for instance, Japanese Patent Application Publication No. 2003-167059).

Semiconductor-type radiation detectors are also known as ordinary radiation detection sensors. In semiconductor-type radiation detectors, radiation strikes a radiation detection element made up of a semiconductor, such as silicon (Si), and charge generated by ionization on account of the radiation is outputted in the form of electric signals, whereby radiation is detected.

Patent document 1: Japanese Patent Application Publication No. 2003-167059
Patent document 2: Japanese Patent Application Publication No. S63-193088

Hand and foot contamination monitors and surface contamination monitors are used not only for inspection of contamination from radioactive substances on the surface of personnel and objects that enter and leave a facility where radiation is worked with, but also, as the case may require, for primary inspection of surface contamination by radioactive substances at locations, within the facility, where radioactive substances are handled. However, using radiation detection sensors in the form of GM counters, gas flow counters, and scintillator-type radiation detectors was problematic in that the hand and foot contamination monitor or the surface contamination monitor was large and heavy, on account of the large size of the radiation detection sensor devices, which precluded the monitor from being relocated to the inspection site in a simple manner.

Thus, smaller and lighter hand and foot contamination monitors can be potentially realized by using semiconductor-type radiation detectors, having a comparatively small device scale, as radiation detection sensors in hand and foot contamination monitors. Also, a semiconductor-type radiation detector that allows maintaining the radiation detection performance over long periods of time would be desirable as a radiation detection sensor in a hand and foot contamination monitor.

DISCLOSURE OF THE INVENTION

In the light of the above, it is an object of the present invention to provide a surface contamination monitor that comprises a hand and foot contamination monitor that can be relocated to an inspection site in a simple manner.

A surface contamination monitor of the present invention is a surface contamination monitor that detects radiation emitted by a radioactive substance that is adhered to a surface of an inspection subject or an inspection object, by way of a radiation detection element, comprising a folding mechanism that allows folding a monitor main body.

The surface contamination monitor is a hand and foot contamination monitor that detects, by way of a radiation detection element, radiation emitted by a radioactive substance that is adhered to a surface of hands, feet and/or clothing of an inspection subject, and comprises a base whose top face is provided with a radiation detection element for measurement of a foot portion, a support column provided at a center of a far side of the top face of the base, and an upper unit, which is fixed to a top end portion of the support column, and on which there is provided a radiation detection element for measurement of a hand portion, the folding mechanism allows the support column to bend towards the top face of the base by way of a first hinge provided at a lower end portion of the support column, and to bend towards an opposite side by way of a second hinge provided at an intermediate section of the support column, and the upper unit juts out beyond an end of the base, in a state where the support column is bent by way of the first and second hinges.

In the surface contamination monitor, the radiation detection element comprises a semiconductor substrate, in which a p-type semiconductor layer is formed on a side of a first surface, and a n-type semiconductor layer, joined to the p-type semiconductor layer, is formed on a side of a second surface that is on an opposite side to the first surface, a first electrode formed on the first surface, a second electrode formed on the second surface, and a protective film, having moisture proofness, that covers an entirety of the first surface including the first electrode.

By virtue of the above features there can be provided a small and lightweight hand and foot contamination monitor that uses, as a radiation detection sensor, a semiconductor-type detector whose radiation detection performance can be maintained over long periods of time.

Preferably, the surface contamination monitor has a silicone resin layer on a side face of the radiation detection element.

The present invention allows providing a surface contamination monitor that comprises a hand and foot contamination monitor that can be relocated to an inspection site in a simple manner.

BEST MODE FOR CARRYING OUT THE INVENTION

An embodiment of the present invention will be explained in detail below with reference to accompanying drawings.

Figure 1:
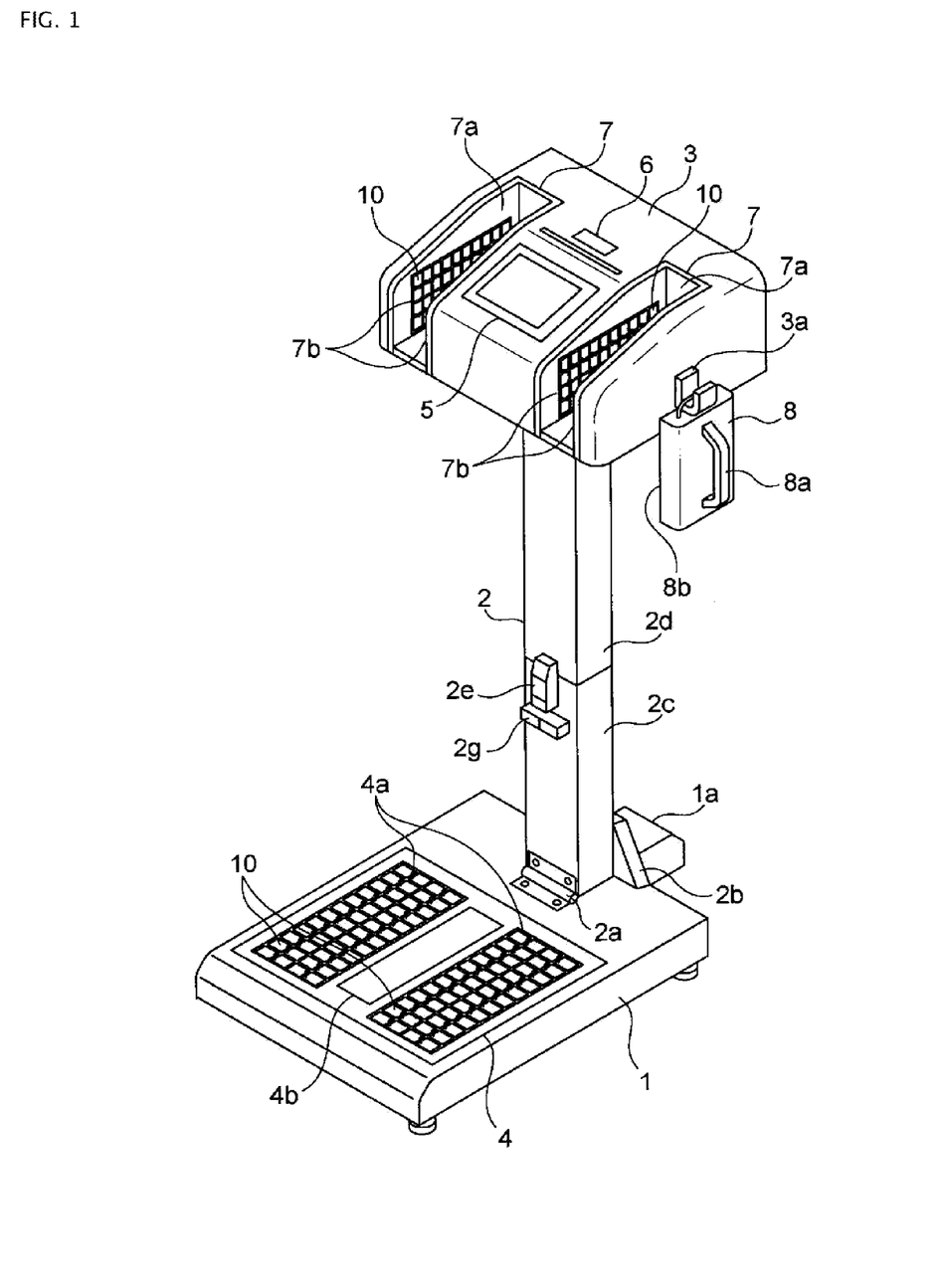
FIG. 1 is a perspective-view diagram of a hand and foot contamination monitor according to an embodiment of the present invention.

FIG. 1 is a perspective-view diagram of a hand and foot contamination monitor of the present embodiment. A hand and foot contamination monitor comprises a base 1, a support column 2 provided at the center of the far side of the top face of the base 1, and an upper unit 3 fixed to the top end portion of the support column 2.

A feet measurement unit 4 is formed at the near side of the top face of the base 1. A left-right pair of radiation detection units 4a is provided in the feet measurement unit 4. The feet of a subject to be measured are placed on the left-right pair of radiation detection units 4a. The left-right pair of radiation detection units 4a detects radiation (α rays, β rays and γ rays) emitted by a radioactive substance that is adhered to the surface of the left and right feet of the subject to be measured. A below-described contact area 4b is provided between the left-right pair of radiation detection units 4a.

A hinge 2a that allows the support column 2 to bend towards the top face of the base 1 is provided at the lower end portion of the front face of the support column 2. A supporting section 2b erected on the support column 2, perpendicularly to the top face of the base 1, is provided at the lower end portion of the rear face of the support column 2. The support column 2 comprises a lower region 2c and an upper region 2d that are connected in the vicinity of the middle of the support column 2. On the front face junction of the lower region 2c there is provided a catch 2e that fixes the support column 2, preventing the latter from bending, through engaging of the catch 2e with a protrusion 2h (FIG. 6) provided at the front face junction of the upper region 2d. A hinge 2f (FIG. 6) that allows the upper region 2d to bend towards the rear face of the lower region 2c is provided at the rear face junction of both the lower region 2c and the upper region 2d. A below-described spacer 2g is provided, below the catch 2e, at the front face junction of the lower region 2c.

The upper unit 3 is shaped as a disc that is thicker than at least the palm of the hand of the subject to be measured. At the central portion of the top face of the upper unit 3 there are provided a display unit 5 that displays radiation measurement results of various areas of the subject to be measured, and a buzzer 6 that issues an alarm on the basis of the radiation measurement results. A left-right pair of hand measurement units 7 is provided in the upper unit 3 so as to flank the display unit 5. Hand insertion sections 7a, into which the hands of the subject to be measured are inserted, are provided at the hand measurement units 7. A pair of radiation detection units 7b is provided on opposing side faces of each hand insertion section 7a. The pairs of radiation detection units 7b detect radiation (α rays, β rays and γ rays) emitted by a radioactive substance that is adhered to the palm and/or back of the hands of the subject to be measured and that are inserted into the hand insertion sections 7a.

A hook 3a that allows a clothing measurement unit 8 to hang down is provided at one side face of the upper unit 3. The clothing measurement unit 8 has substantially a parallelepiped shape. A handgrip 8a for enabling the subject to be measured to grip the clothing measurement unit 8 is provided at one side face of the clothing measurement unit 8, while a radiation detection unit 8b is provided at the other opposing side face. The radiation detection unit 8b detects radiation (α rays, β rays and γ rays) emitted by a radioactive substance that is adhered to the surface of clothing of the subject to be measured.

Figure 2:
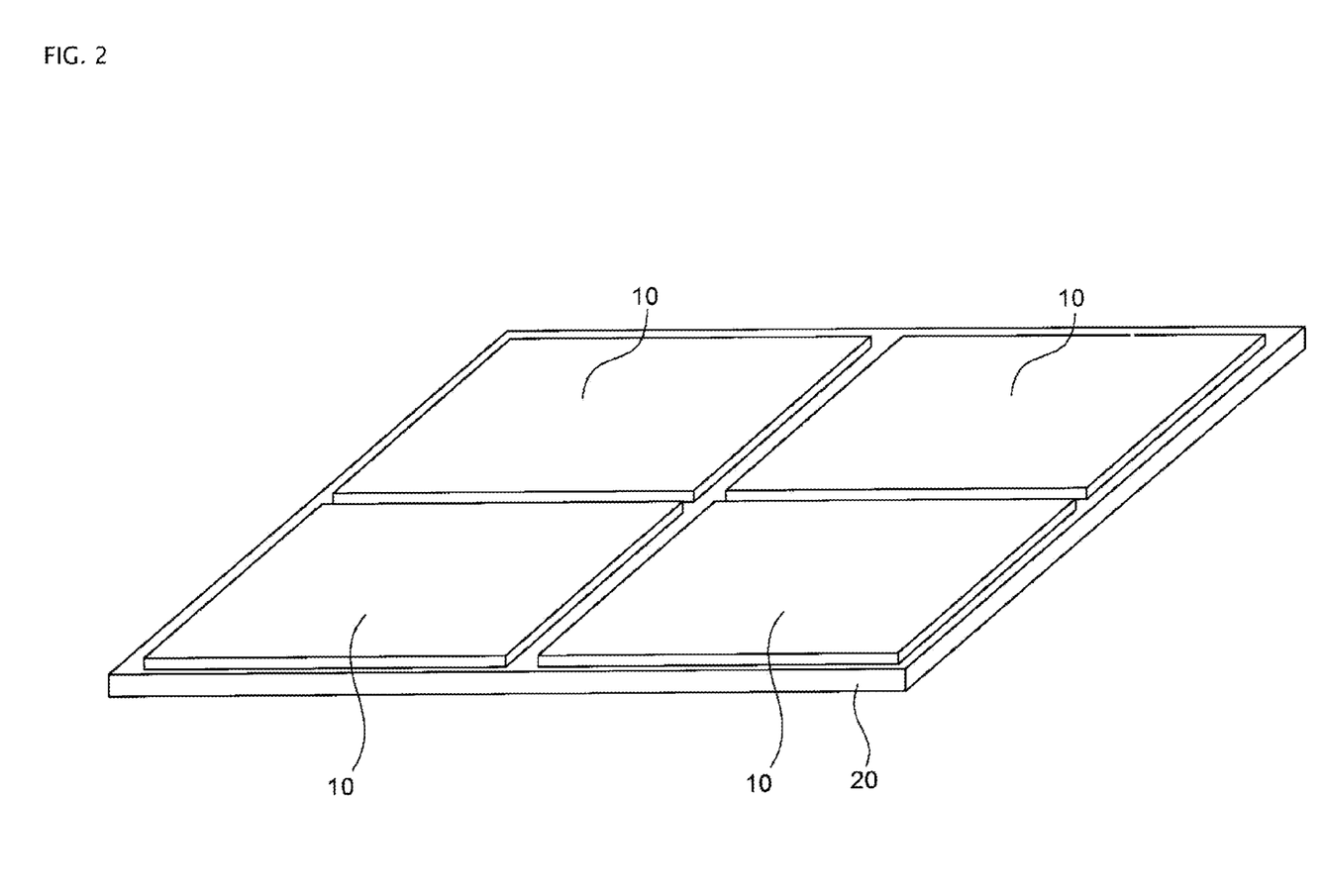
FIG. 2 is a diagram illustrating a radiation detection unit comprising a radiation detection element according to an embodiment of the present invention.

Such radiation detection units 4a, 7b, 8b of the hand and foot contamination monitor are semiconductor-type radiation detectors in which radiation detection elements 10, made up of a semiconductor, are arrayed two-dimensionally close to each other. The number of radiation detection elements 10 that are arrayed on the radiation detection units 4a, 7b, 8b can be appropriately modified. Each radiation detection unit 4a, 7b, 8b may be a combination of a plurality of radiation detection units 50 such as the one illustrated in FIG. 2. In the radiation detection unit 50 illustrated in FIG. 2 four radiation detection elements 10 are fixed to one substrate 20.

Figure 3:
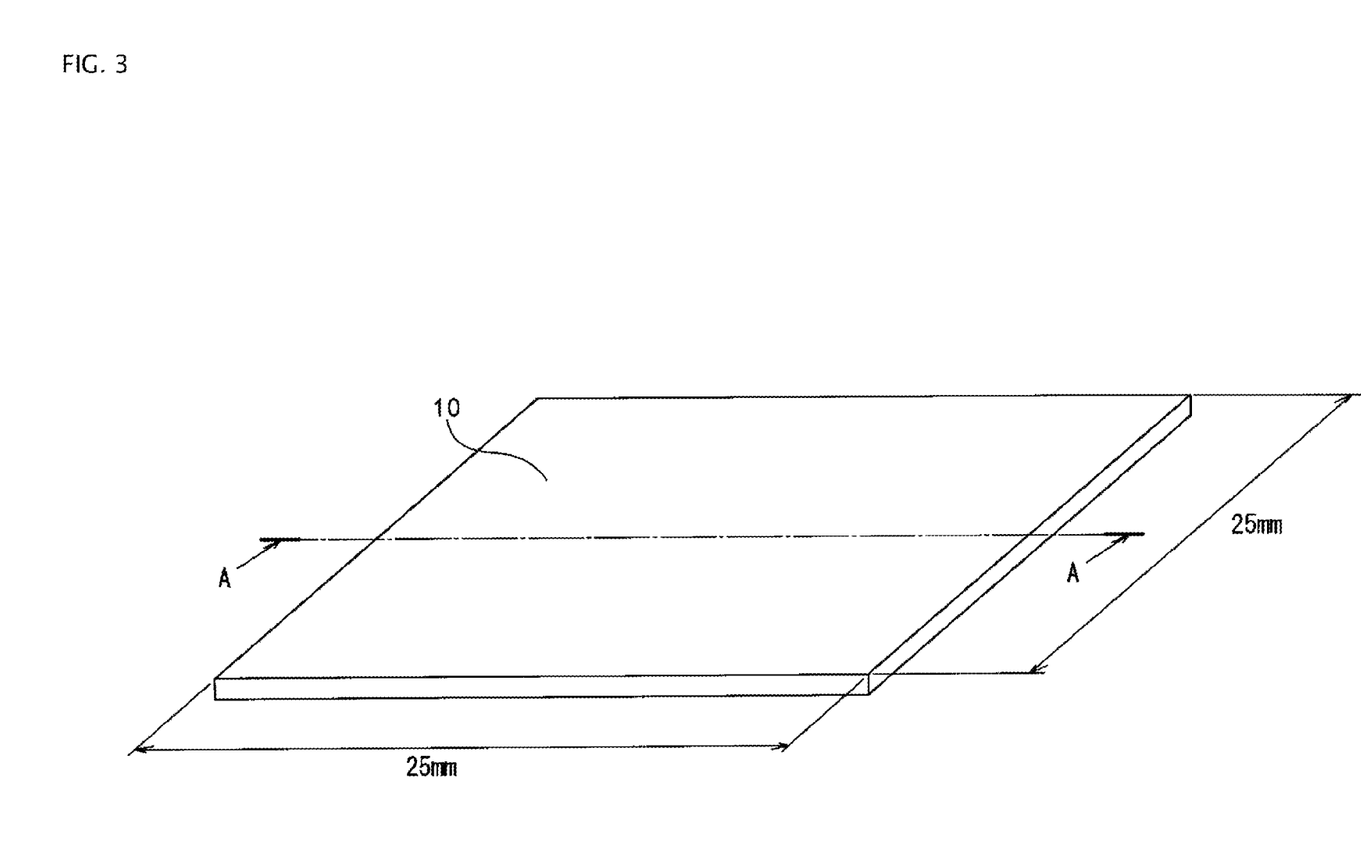
FIG. 3 is a perspective-view diagram of a radiation detection element according to an embodiment of the present invention.
Figure 4:
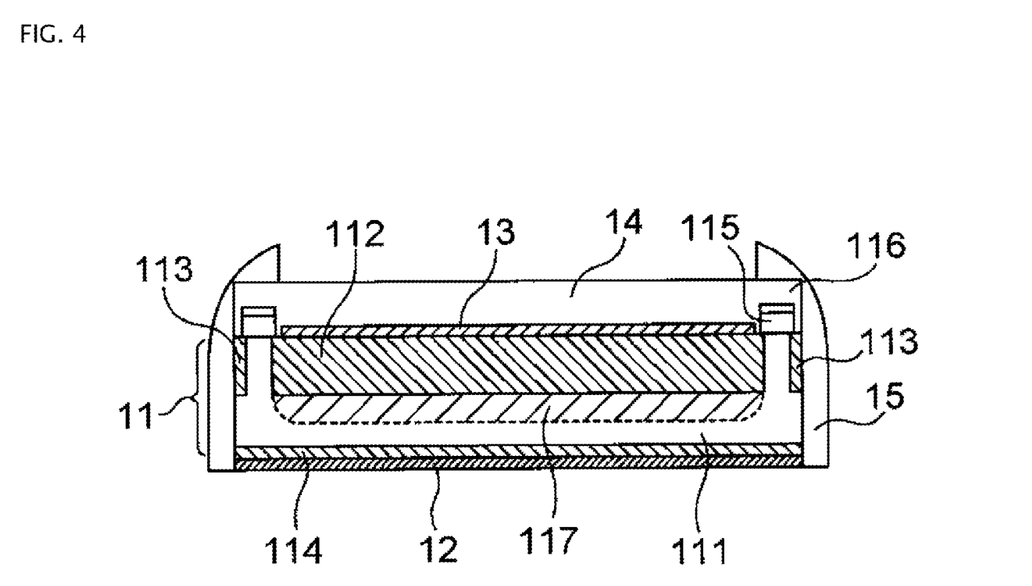
FIG. 4 is a cross-sectional diagram of a radiation detection element according to an embodiment of the present invention.

FIG. 3 is a perspective-view diagram of a radiation detection element comprised in a radiation detection unit of a hand and foot contamination monitor according to the present embodiment. As illustrated in FIG. 3, a radiation detection element 10 has a 25 mm square flat-plate shape. To describe in detail the configuration of the radiation detection element 10, the cross-sectional shape of the radiation detection element 10 along line A in FIG. 3 will be explained with reference to FIG. 4. As illustrated in FIG. 4, the radiation detection element 10 comprises mainly a detection unit 11, a circuit board-side electrode 12, a detection surface-side electrode 13, a silicon nitride film 14 as a surface protective layer, and a silicone resin layer 15 as a side face protective layer.

The detection unit 11 of the radiation detection element 10 is made up of an n-type semiconductor substrate, herein an n-type silicon substrate 111. A p$^-$ layer 114 is provided on one main surface of the n-type silicon substrate 111. The p$^-$ layer 114 is a layer having a low impurity concentration, i.e. a high electric resistance value, and is a layer for eliciting ohmic contact with the below-described circuit board-side electrode 12. The p$^-$ layer 114 is formed through diffusion of an element such as boron or the like, into an n-type silicon substrate.

A p layer 112 is formed on the other main surface of the n-type silicon substrate 111. The depth of the p layer 112 is of about several tens of μm. The p layer 112 is formed, for instance, as follows. Firstly, a silicon oxide film is deposited, by sputtering or the like, on the other main surface of the n-type silicon substrate 111, a silicon oxide film is patterned so as to leave open a portion corresponding to the formation region of the p layer 112, and an element such as boron or the like is caused to diffuse into the exposed n-type silicon substrate, using the remaining silicon oxide film as a mask, after which the silicon oxide film is removed.

A p$^+$ layer 113 is provided outside the n-type silicon substrate 111 that is exposed on the outer side of the p layer 112. The p$^+$ layer 113 is a layer having a high impurity concentration, i.e. a low electric resistance value. The p$^+$ layer 113 is connected to ground, and is at the same potential as the circuit board-side electrode 12. Electrons move through formation of a positive electric field in the vicinity of the p$^+$ layer 113 as well. Since current does not flow in this region, a depletion layer 117 is prevented as a result from spreading up to the side face. Leakage current can be reduced through the presence of such a p+ layer 113. In the p+ layer 113, a silicon oxide film is deposited, by sputtering or the like, on the other main surface of the n-type silicon substrate 111, a silicon oxide film is patterned so as to leave open a portion corresponding to the formation region of the p+ layer 113, and an element such as boron or the like is caused to diffuse into the exposed n-type silicon substrate 111, using the remaining silicon oxide film as a mask, after which the silicon oxide film is removed.

A silicon oxide film 115 is formed on the n-type silicon substrate 111 exposed outside the p layer 112. The silicon oxide film 115 prevents leakage current from flowing in a direction along the surface, upon polarity reversal at the region of the exposed n-type silicon substrate 111. To form the silicon oxide film 115, a silicon oxide film is deposited, by sputtering or the like, on the other main surface of the n-type silicon substrate 111, and the silicon oxide film 115 is patterned so as to remain on the exposed n-type silicon substrate. The top layer of the silicon oxide film 115 is a gettering layer 116. The purpose of the gettering layer 116 is to capture and remove impurities comprised in the silicon oxide film layer. The gettering layer 116 is formed through surface reformation by doping phosphorus into the silicon oxide film 115.

The circuit board-side electrode 12 is formed on the p⁻ layer 114 of the n-type silicon substrate 111. The circuit board-side electrode 12 is formed by depositing an electrode material on the p⁻ layer 114, for instance by sputtering or the like. A detection surface-side electrode 13 is formed on the P layer 112 of the n-type silicon substrate. To form the detection surface-side electrode 13, an electrode material is deposited on the p layer 112, for instance by sputtering or the like, and then the electrode material is patterned so as to leave the detection surface-side electrode 13 on the P layer 112. Preferably, the detection surface-side electrode 13 is a conductive film, of aluminum or the like, that doubles as a light-shielding film.

On the side of the other main surface of the n-type silicon substrate 111 there is formed the silicon nitride film 14, as a surface-side protective layer, in such a way so as to cover that surface. The purpose of the silicon nitride film 14 is to prolong the life of the radiation detection element 10 while maintaining the radiation detection performance. Given that leakage currents increase due to stress generated on account of high hardness, the thickness of the silicon nitride film 14 ranges preferably from 0.5 µm to 1.5 µm. The silicon nitride film 14 is formed by depositing silicon nitride on the other main surface of the n-type silicon substrate 111, by sputtering or the like. The silicon nitride film is a protective film having excellent moisture proofness, as borne out in a below-described environmental resistance test (accelerated test). Other than a silicon nitride film, a paraxylynene-based organic thin film may be also used as a protective film having a similar environmental resistance performance.

A silicone resin layer 15 is provided, as a side face protective layer, on the side face region of the detection unit 11, excluding the top face (sensitive portion region). The purpose of the silicone resin layer 15 as well is to prolong the life of the radiation detection element 10 while maintaining the radiation detection performance. Providing the silicon nitride film 14 and the silicone resin layer 15 allows prolonging the life of the radiation detection element 10 more reliably while maintaining the radiation detection performance. The silicone resin layer 15 is formed by coating the side face of the detection unit 11 with a silicone resin, and drying then the resin.

In such a detection unit 11, the p layer 112 may be an amorphous silicon layer. Specifically, a film of amorphous silicon may be formed by CVD (chemical vapor deposition) on the n-type silicon substrate 111 via a mask having an opening at the p layer formation region, to form thereby an amorphous silicon p layer on the n-type silicon substrate 111.

Herein, a β-ray radiation detection element counts (captures) not only β rays but also light. In consequence, there is concomitantly used an organic film, of polyimide or the like, that has light-shielding ability and excellent environmental resistance performance (moisture permeation performance) and is capable of preventing contamination of the element during use. In the case of α rays, which have a shorter range than β rays, the thickness of the protective film can be secured only up to about 6 µm, and hence it is difficult to impart a sufficient moisture proofness function to the protective film. As a result, it is necessary to confer sufficient moisture proofness to the protective film that is formed on the radiation detection element. Accordingly, the entire surface, including the electrode portion, is covered by a silicon nitride film (or paraxylynene-based organic thin film), whereby sufficient moisture proofness is imparted to the protective film. Light-shielding ability can be realized by using, as the detection surface-side electrode 13, a conductive film that doubles as a light-shielding film, for instance of aluminum or the like.

Figure 5:
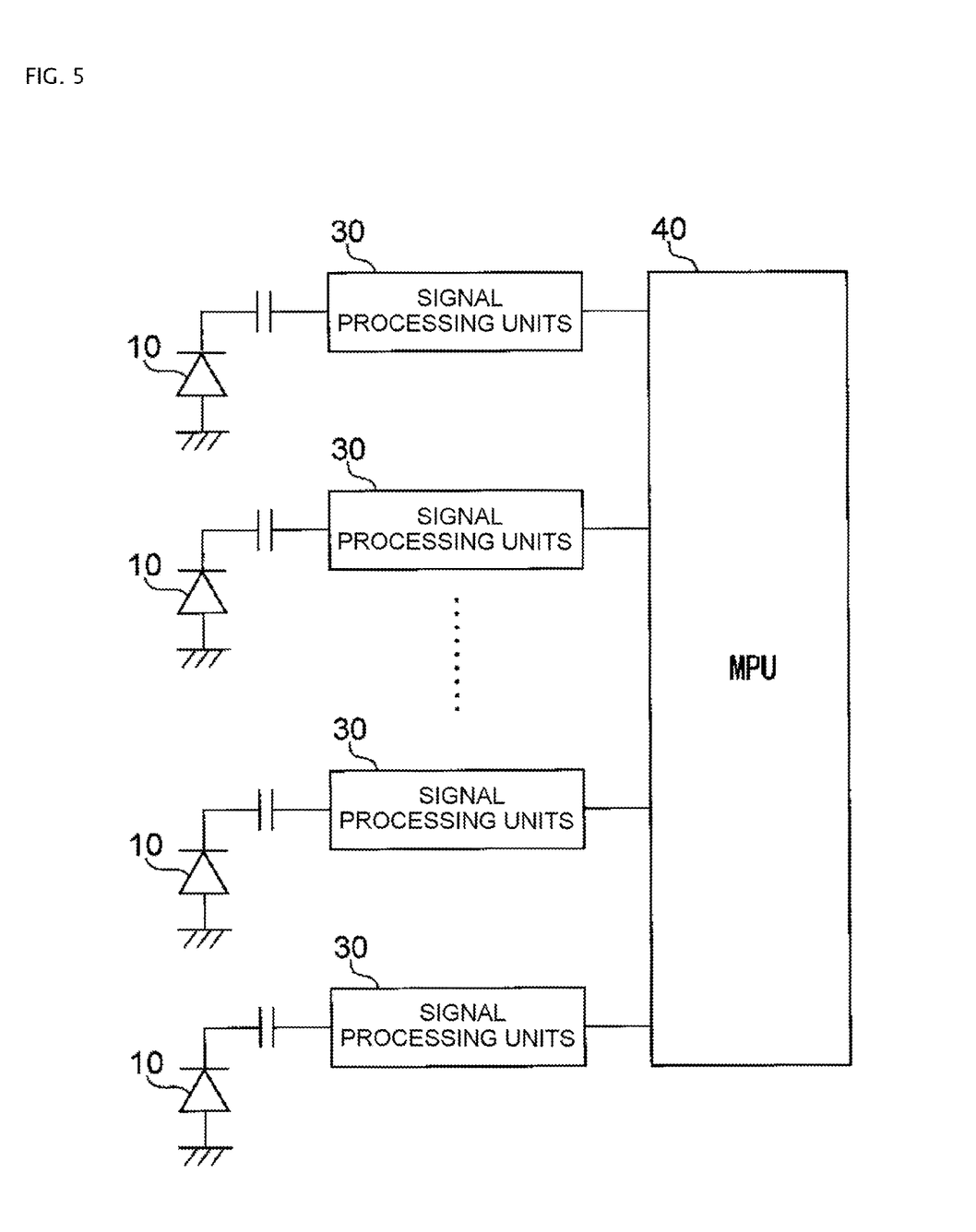
FIG. 5 is a circuit block diagram according to an embodiment of the present invention.

A circuit block such as the one illustrated in FIG. 5 is connected to the above-described radiation detection units 4a, 7b, 8a. FIG. 5 is a circuit block diagram of the radiation detection unit of the hand and foot contamination monitor of the present embodiment. As illustrated in FIG. 5, a signal processing unit 30 is provided for each radiation detection element 10 in the radiation detection units 4a, 7b, 8a. The signal processing units 30 are connected to an MPU 40.

Each signal processing unit 30 amplifies a signal emitted by a respective radiation detection element 10. The MPU 40 detects the signals amplified by the signal processing units 30, counts the detection signals, and calculates a radiation dose on the basis of the count results. If the calculated radiation dose exceeds a predetermined value, the MPU 40 controls a buzzer 6 of the hand and foot contamination monitor so as to issue an alarm, and controls the display unit 5 so as to display a warning about a contaminated area at which the calculated radiation dose exceeds a predetermined value. The MPU 40 can pinpoint more in detail the contaminated area by controlling the count range of the detection signals from the radiation detection elements 10.

An explanation follows next, with reference to FIG. 1 and FIG. 4, on the operation of detecting radiation emitted by a radioactive substance that is adhered to the hands, feet and clothing of a subject to be measured, in the hand and foot contamination monitor having the above-described configuration.

In order to detect a radioactive substance that is adhered to the surface of the hands and/or feet, the subject to be measured places both feet on the left-right pair of radiation detection units 4a provided in the feet measurement unit 4 of the hand and foot contamination monitor illustrated in FIG. 1, presses a hand and/or feet measurement start button (not shown), and inserts both hands into the hand insertion sections 7a that are provided in the pair of hand measurement units 7. In order to detect a radioactive substance that is adhered to the surface of the clothing, after inspection of the hands and/or feet, the subject to be measured grips the handgrip 8a of the clothing measurement unit 8, presses a clothing measurement start button (not shown), and brings the radiation detection unit 8b close to his/her clothing.

When the subject to be measured presses the hand and/or feet measurement start button or the clothing measurement start button, voltage is applied to the radiation detection elements 10 arrayed on the radiation detection units 4a, 7b, 8b.

The depletion layer 117 forms in the n-type silicon substrate 111 upon application of a negative voltage to the p layer 112 and of a positive voltage to the n-type silicon substrate 111, i.e. upon application of reverse bias to the pn junction, in the radiation detection element 10 illustrated in FIG. 4. The depletion layer 117 is a region of high resistivity and high electric field intensity. Therefore, when radiation such as β rays strikes the radiation detection element 10 in that state, ionization occurs at the depletion layer 117, giving rise to secondary electrons that are effectively collected. These effectively collected secondary electrons elicit a pulse-like current signal. Radiation can be detected by detecting this pulse-like current signal.

In the radiation detection elements 10 having the above configuration, i.e. wherein the silicon nitride film 14 is formed so as to cover the other main surface of the n-type silicon substrate 111, the radiation detection performance can be maintained over long periods of time thanks to a configuration wherein the silicone resin layer 15 is provided at a region that encompasses at least the side face of the detection unit 11. Specifically, it has been found that leakage current can be kept not higher than a target leakage current value 150 nA (room temperature) (actual measurement value not higher than 100 nA), over 1000 hours or more, in an accelerated test that involves exposing the radiation detection element 10, having the configuration illustrated in FIG. 4, at 85° C. and 85% RH, while under application of a 150 V reverse bias.

In the radiation detection element 10 having the configuration according to the present embodiment there can be reduced the bias voltage required for forming a sufficient depletion layer 117 for effectively collecting radiation ionization in the form of secondary electrons. A structure where an n layer is provided in a p type silicon substrate requires a 200 V bias voltage in order to form a sufficient depletion layer 117. Breakdown voltage properties must be enhanced overall in such a configuration. By contrast, in the structure illustrated in FIG. 4, i.e. a structure wherein the p layer 112 is provided in the n-type silicon substrate 111, a sufficient depletion layer 117 can be formed by a bias voltage of 100 V or lower. The structure illustrated in FIG. 4 is therefore advantageous from the viewpoint of breakdown voltage.

Thus, the hand and foot contamination monitor according to the present embodiment allows providing a small and lightweight hand and foot contamination monitor that uses, as a radiation detection sensor, a semiconductor-type detector whose radiation detection performance can be maintained over long periods of time.

Figure 6:
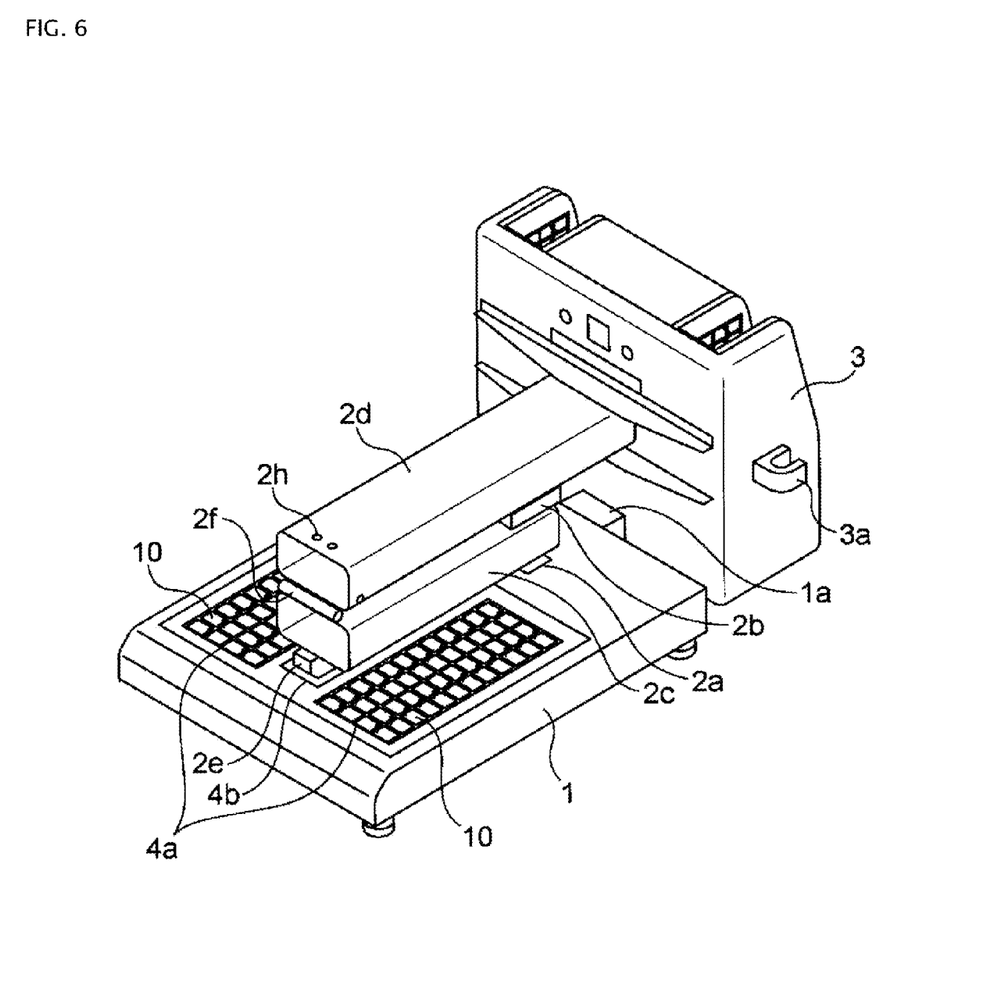
FIG. 6 is a perspective-view diagram illustrating a bent structure of a support column of a hand and foot contamination monitor according to an embodiment of the present invention.

The hand and foot contamination monitor according to the present embodiment can adopt a shape that facilitates conveyance, through folding of the support column 2, upon storage or transport to an installation site. Also, the space taken up by the hand and foot contamination monitor can be reduced. FIG. 6 is a diagram illustrating the support column of the hand and foot contamination monitor of the present embodiment with the support column in a bent state.

In FIG. 6, the catch 2e, which engages with the protrusion 2h of the upper region 2d of the support column 2 in FIG. 1, is now released, and the lower region 2c is bent towards the top face of the base 1, by way of the hinge 2a. The length of the lower region 2c is limited in such a manner that the lower region 2c does not protrude beyond the base 1 when the lower region 2c is bent. The contact area 4b is provided between the pair of radiation detection units 4a of the feet measurement unit 4 of the base 1. The purpose of the contact area 4b is to come into contact with the spacer 2g and the catch 2e of the lower region 2c when the lower region 2c is bent towards the top face of the base 1. Providing thus the contact area 4b allows preventing damage to the radiation detection elements 10, caused by contact between the lower region 2c and the radiation detection units 4a, upon bending of the lower region 2c.

In FIG. 6, the upper region 2d, with the catch 2e released, is bent towards the rear face of the lower region 2c, by way of the hinge 2f. The supporting section 2b provided at the lower end portion of the rear face of the lower region 2c is accommodated between the bent lower region 2c and upper region 2d. The length of the upper region 2d is set to a length such that the upper unit 3, fixed to the top end portion of the upper region 2d, protrudes beyond the base 1 when the upper region 2d is bent. At the rear face of the base 1 there is provided a fixing section 1a that fixes the upper unit 3 that protrudes beyond the base 1 when the upper region 2d is bent. The fixing section 1a fixes the upper unit 3 through engaging of the fixing section 1a with a groove (not shown) that is provided at the rear face of the upper unit 3. The foldable configuration of the support column 2 allows thus the hand and foot contamination monitor to be formed to a shape that facilitates conveyance of the hand and foot contamination monitor, and allows reducing the space taken up by the hand and foot contamination monitor.

In the present embodiment a hand and foot contamination monitor has been explained that detects, by way of the radiation detection elements 10, radiation emitted by a radioactive substance that is adhered to the surface of hands and/or feet, and the surface of clothing, of an inspection subject (subject to be measured). However, the present invention can be suitable used also in a surface contamination monitor (for instance, a laundry monitor, or a product-surface contamination monitor) in which there is detected, by way of the radiation detection elements 10, radiation emitted by a radioactive substance adhered to the surface of an inspection object.

The present application is based on Japanese Patent Application No. 2009-164092, filed on Jul. 10, 2009, the entire contents whereof are incorporated herein by reference.

The invention claimed is:

1. A surface contamination monitor that detects radiation emitted by a radioactive substance that is adhered to a surface of an inspection subject or an inspection object, by way of a radiation detection element, the surface contamination monitor comprising:
    a folding mechanism that allows folding a monitor main body;
    a base whose top face is provided with a radiation detection element for measurement of a foot portion;
    a support column provided at a center of a far side of the top face of the base; and
    an upper unit, which is fixed to a top end portion of the support column, and on which there is provided a radiation detection element for measurement of a hand portion;
    the folding mechanism including:
        a first hinge provided at a lower end portion of the support column, wherein the first hinge allows the support column to bend towards the top face of the base; and
        a second hinge provided at an intermediate section of the support column, wherein the second hinge allows the support column to bend towards an opposite side, and wherein the upper unit juts out beyond an end of the base, in a state where the support column is bent by way of the first and second hinges,
    wherein the surface contamination monitor is a hand and foot contamination monitor that detects, by way of the radiation detection element, radiation emitted by a radioactive substance that is adhered to a surface of hands, feet and/or clothing of an inspection subject.

2. The surface contamination monitor according to claim 1, wherein the radiation detection element comprises a semiconductor substrate, in which a p-type semiconductor layer is formed on a side of a first surface, and an n-type semiconductor layer, joined to the p-type semiconductor layer, is formed on a side of a second surface that is on an opposite side to the first surface, a first electrode formed on the first surface, a second electrode formed on the second surface, and a protective film, having moisture proofness, that covers an entirety of the first surface including the first electrode.

3. The surface contamination monitor according to claim 2, wherein the protective film having moisture proofness has a silicon nitride film.

4. The surface contamination monitor according to claim 2, wherein the protective film having moisture proofness has a paraxylynene-based organic thin film.

5. The surface contamination monitor according to claim 2, wherein the first electrode is formed by a conductive film having light-shielding ability.

6. The surface contamination monitor according to claim 2, wherein part of the n-type semiconductor layer is formed on the side of the first surface, so as to surround a side face of the p-type semiconductor layer, another p-type semiconductor layer is formed, via the n-type semiconductor layer, outside the side face of the p-type semiconductor layer, and the other p-type semiconductor layer and the second electrode are electrically connected so as to be at a same potential.

7. The surface contamination monitor according to claim 2, wherein a silicon oxide film is formed on the first surface at a region at which the n-type semiconductor layer is formed.

8. The surface contamination monitor according to claim 2, wherein the semiconductor substrate is an n-type semiconductor substrate, and the p-type semiconductor layer is a semiconductor layer formed through diffusion of an impurity element into the n-type semiconductor substrate.

9. The surface contamination monitor according to claim 2, having a $p^-$ layer of lower impurity concentration than that of the p-type semiconductor layer, between the n-type semiconductor layer and the second electrode.

10. The surface contamination monitor according to claim 2, having a silicone resin layer on a side face of the radiation detection element.

* * * * *